United States Patent [19]

Wheeler et al.

[11] 4,119,156

[45] Oct. 10, 1978

[54] IMPLEMENT FRAME WITH CASTER WHEEL AND LOCK THEREFOR

[75] Inventors: Keith A. Wheeler; Dawson W. Hastings, both of La Porte, Ind.

[73] Assignee: Allis-Chalmers Corporation, Milwaukee, Wis.

[21] Appl. No.: 749,723

[22] Filed: Dec. 13, 1976

[51] Int. Cl.² ............................................. A01B 63/22
[52] U.S. Cl. .................................... 172/386; 172/417
[58] Field of Search ............... 172/386, 282, 283, 285, 172/383, 240, 407, 413, 417, 669; 280/43.23, 80 R; 180/24.02; 16/35 R

[56] References Cited

U.S. PATENT DOCUMENTS

| | | | |
|---|---|---|---|
| 2,682,822 | 7/1954 | Toland et al. | 172/386 |
| 3,106,971 | 10/1963 | Bushmeyer et al. | 172/386 |
| 3,559,746 | 2/1971 | Couser | 172/386 |
| 3,633,679 | 1/1972 | Dahlberg et al. | 172/386 X |
| 4,026,365 | 5/1977 | Andersson et al. | 172/386 |

*Primary Examiner*—Richard T. Stouffer
*Attorney, Agent, or Firm*—Charles L. Schwab

[57] ABSTRACT

A latch mechanism is provided for locking the front furrow wheel of a plow when the plow frame is in its lowered plowing position. The latch mechanism is inoperative when the plow frame is raised to its transport position, thus permitting the castered furrow wheel support to freely rotate about the vertical spindle pivot axis. A latch is pivoted to the upper end of the vertical spindle about a horizontal axis and has a downwardly extending finger adapted to drop into a recess in a flat ramp on the upper link of a parallel lift linkage for the castered furrow wheel.

8 Claims, 7 Drawing Figures

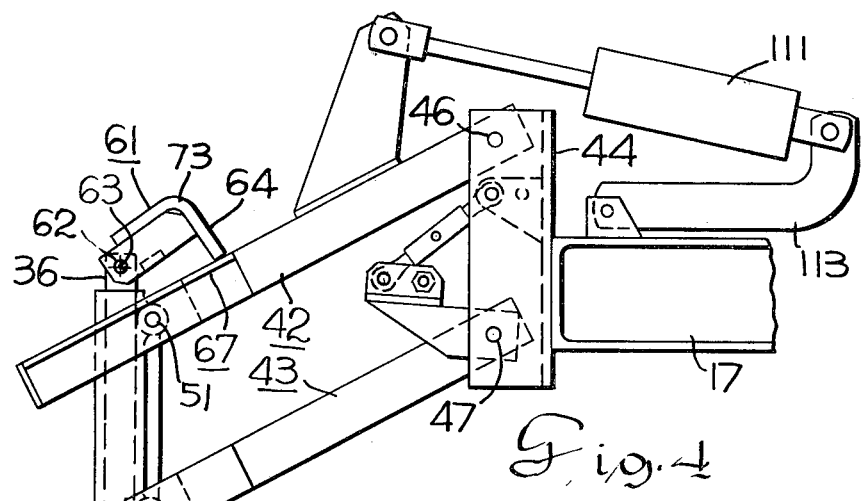
Fig. 4
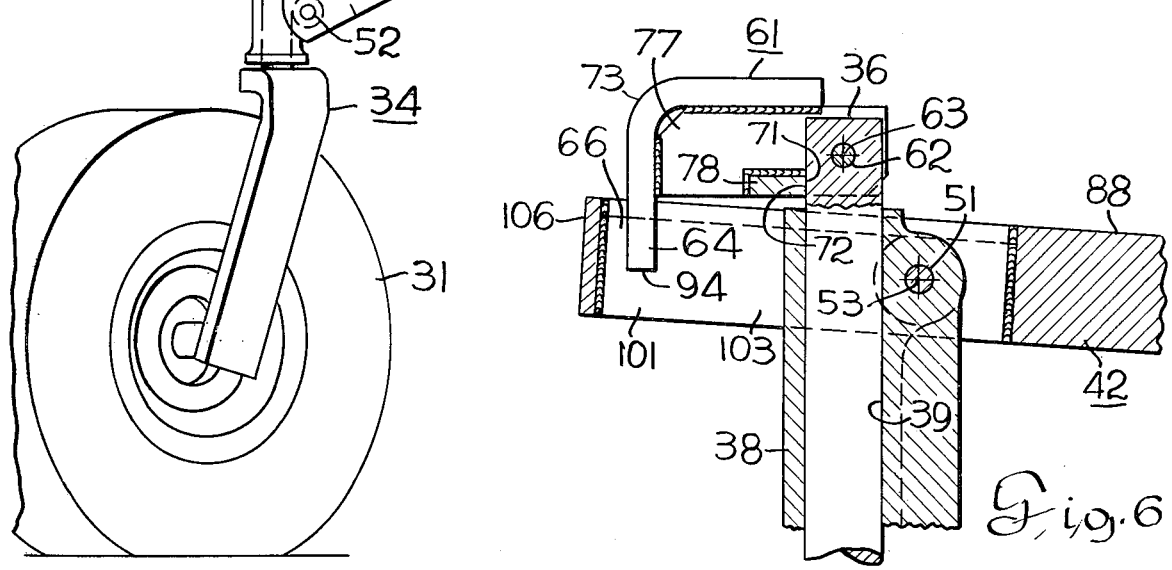
Fig. 6
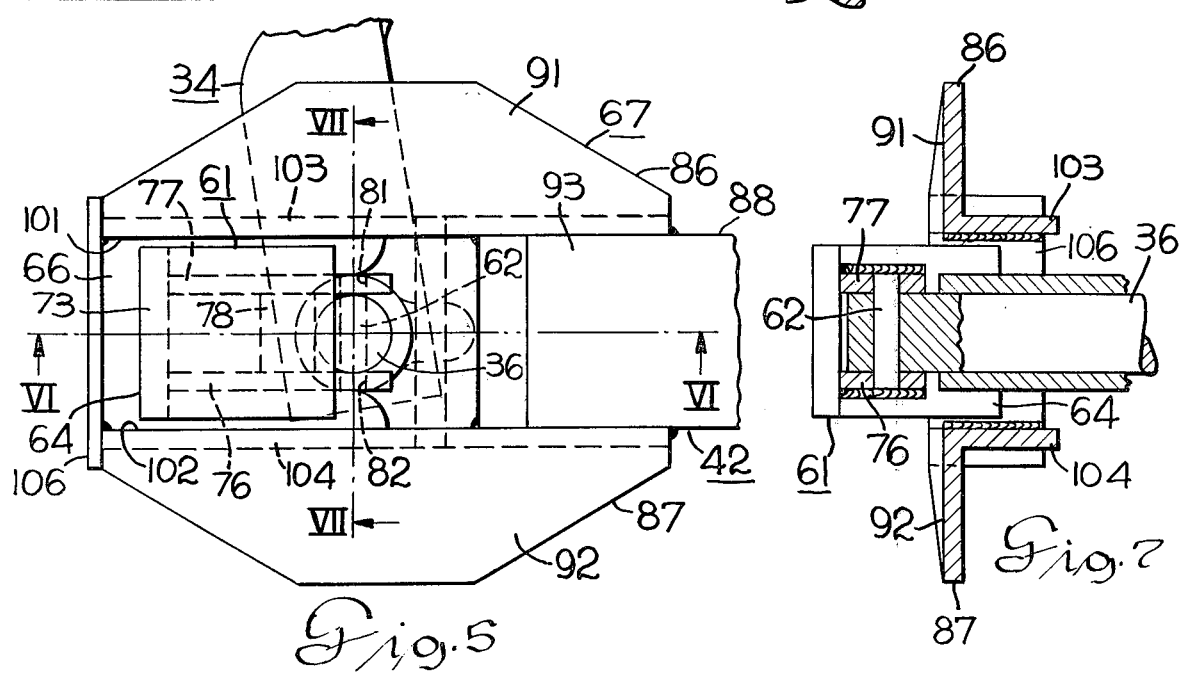
Fig. 5
Fig. 7

IMPLEMENT FRAME WITH CASTER WHEEL AND LOCK THEREFOR

BACKGROUND OF THE INVENTION

An adjustable friction device for retarding the castering movement of a support wheel for a plow is shown in U.S. Pat. No. 3,488,064 issued to R. G. Moe on Jan. 6, 1970 for an Implement Caster Wheel. An implement with front and rear castered wheels for supporting a ground working implement wherein the front wheels are locked in the lowered position of the implement is shown in U.S. Pat. No. 3,633,679. U.S. Pat. Nos. 2,843,948 and 3,701,385 show a castered wheel for an earthworking implement wherein the castered wheel is locked in the raised transport position of the implement. Agricultural implements with castered wheels which are locked in the lowered position of the implement are shown in U.S. Pat. Nos. 1,489,467; 1,598,803; 1,865,598; 2,682,822; 2,824,505; 3,106,971 and 3,448,815.

BRIEF DESCRIPTION OF THE INVENTION

A flat upward-facing camming surface is provided on the upper side of the upper link of a parallel linkage employed to interconnect a castered furrow wheel to the frame of a plow. The camming surface is interrupted by wall means in the ramp presenting confronting surfaces defining a recess. A latch is pivotally connected on a horizontal axis to the upper end of the spindle part of the castered wheel support and includes a downwardly extending finger, in spaced relation to the horizontal pivot axis, which aligns with the recess when the castered furrow wheel is in a normal straight ahead working position for a normal plowing operation. When the plow frame is lowered, the latching finger drops into the recess thus locking the castered furrow wheel support against swinging movement about the axis of its spindle part. When the parallel linkage is actuated to raise the plow frame, the latch disengages from the recess and the wheel support is free to rotate about its vertical spindle axis. When the plow frame is in a raised transport position and the plow is being backed, that is, moved in a reverse direction from its normal plowing direction, the finger of the latch will ride on the inclined camming surface but will not restrict rotary movement of the castered wheel support about its spindle axis.

BRIEF DESCRIPTION OF THE DRAWINGS

One embodiment of the present invention is illustrated by the drawings in which:

FIG. 4 is a view similar to FIG. 3 except showing the castered wheel pivoted 180 degrees from that shown in FIG. 3;

FIG. 5 is a view taken along the line V—V in FIG. 2;

FIG. 6 is a section view taken along the line VI—VI in FIG. 5; and

FIG. 7 is a section view taken along the line VII—VII in FIG. 5.

DETAILED DESCRIPTION OF THE DRAWINGS

Figure 1:
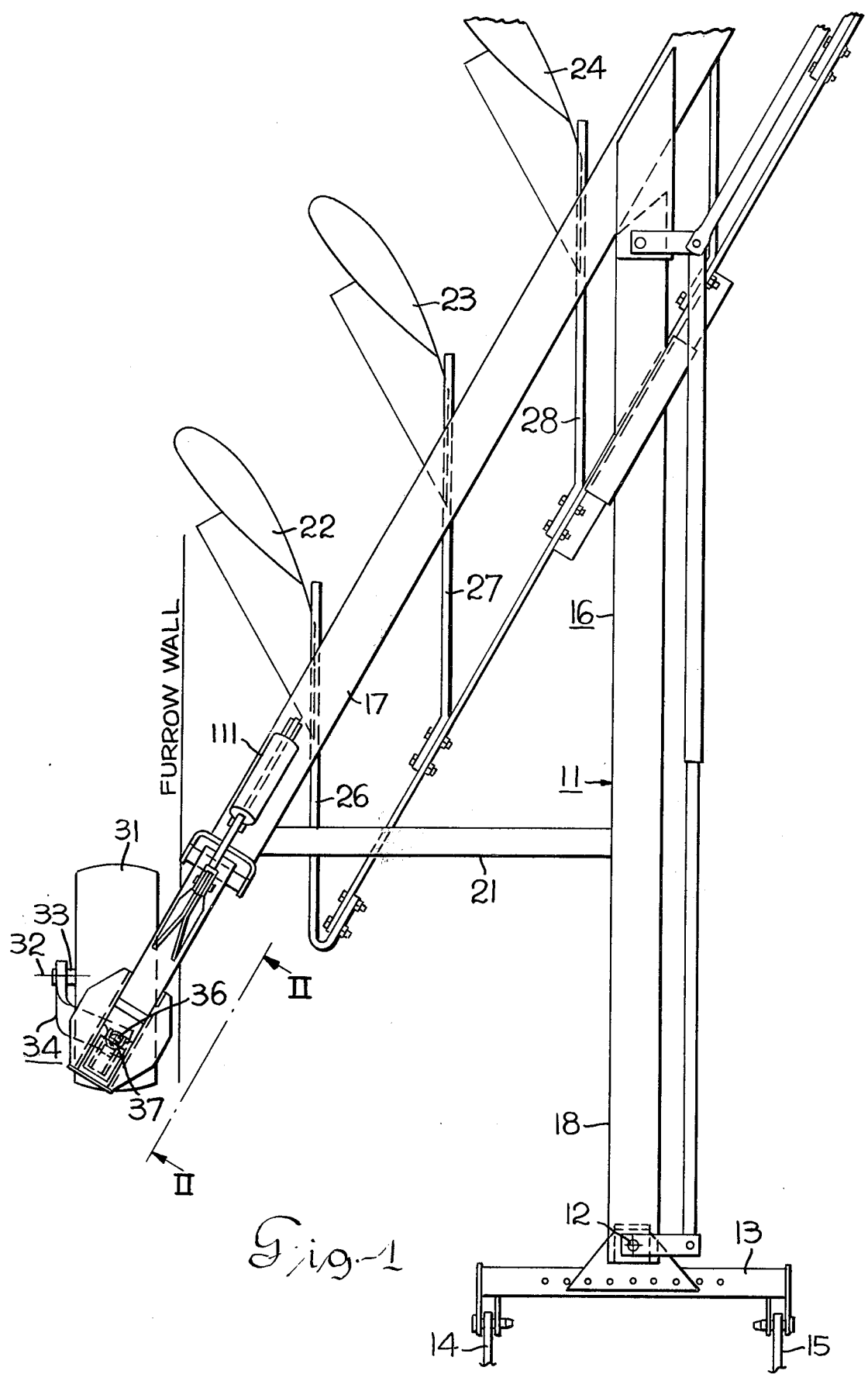
FIG. 1 is a top view of part of a plow in which the present invention is incorporated.

Referring to FIG. 1, a multiple bottom plow 11 has a draft member 18 pivotally connected on a vertical pivot axis 12 to a pull bar 13 which in turn is connected to the lift links 14, 15 of a tractor. The plow 11 includes a main frame 16 having a diagonal beam 17 and a longitudinal disposed tongue or draft member 18 which are rigidly interconnected by a transverse brace 21. The plow includes bottoms 22, 23, 24 which are secured to plow beams 26, 27, 28 which in turn are secured to the frame 16. In a large plow drawn by a tractor with no wheels in the furrow, it is desirable to have a front castered furrow wheel 31. The ground engaging furrow wheel 31 is mounted on an axle 33 for rotation about a horizontal pivot axis 32. The axle 33 is rigidly secured to the lower end of a castering wheel support 34 which includes an upstanding spindle part 36 having a vertical axis 37.

Figure 2:
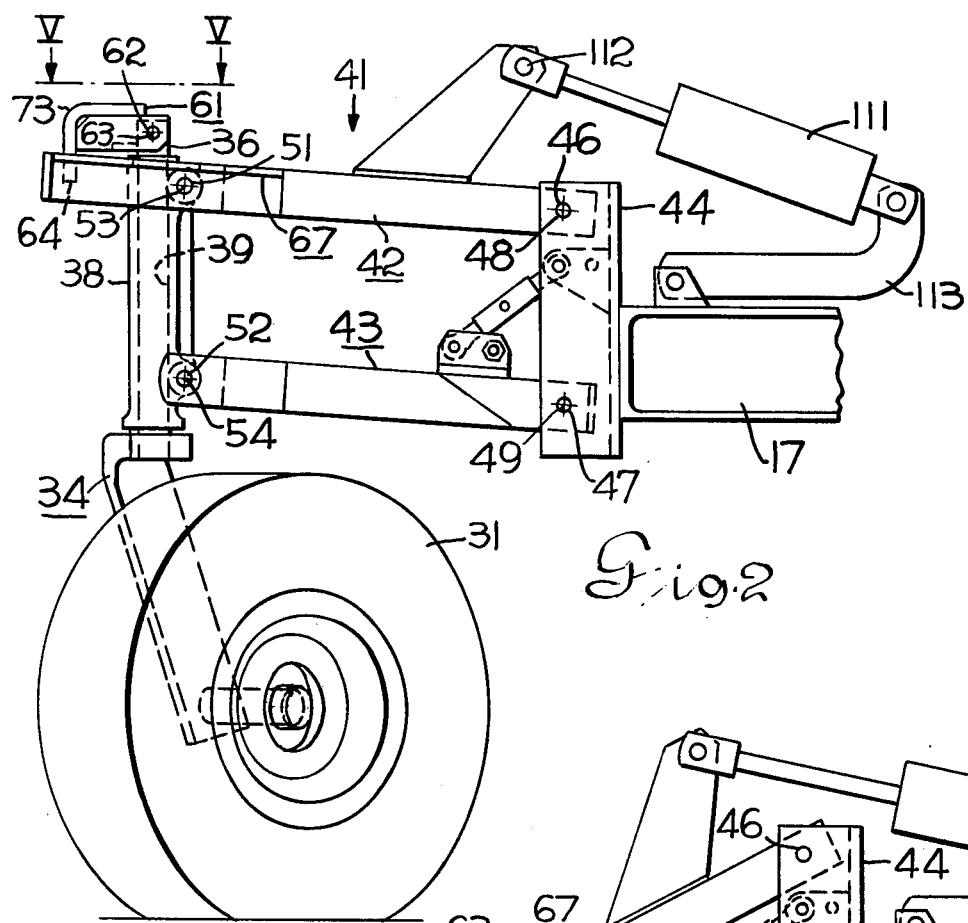
FIG. 2 is a view taken along the line II—II in FIG. 1 with the plow frame in its lowered working position.

Referring also to FIG. 2, the upstanding spindle part 36 is rotatably journaled in bearing means in the form of a housing 38 having a cylindrical bore 39 rotatably receiving the spindle part 36 in bearing relation thereto. The castered furrow wheel 31 is connected to the plow frame 17 by a parallel lift linkage 41 which includes a pair of parallel link parts or links 42, 43 pivotally connected at their rear ends to a bracket 44 on the frame 17 by a pair of pins 46, 47 having vertically spaced parallel and horizontally disposed axes 48, 49. The front ends of the links 42, 43 are pivotally connected to the housing by a pair of parallel and vertically spaced pins 51, 52 which have parallel, horizontal and vertical spaced axes 53, 54. The plow frame is raised and lowered between transport and working positions by a hydraulic ram 111 which has its rod end pivotally connected to the upper link 42 by a pin 112 and its cylinder end connected to the beam 17 of the plow frame 16 by a link 113.

Referring also to FIGS. 5, 6 and 7, a latch 61 is pivotally connected to the upper end of the spindle part 36 by a pin 62 having a horizontal axis 63. The latch 61 includes a downwardly extending finger 64 which is disposed within a recess 66 in a flat ramp 67 on the upper link 42. Vertical swinging movement of the latch 61 in the direction toward the ramp is limited by engagement of stop means on the latch 61 and spindle part 36 in the form of abutment surfaces 71, 72 on the latch and spindle part, respectively. The latch 61 includes a bent plate 73 having a horizontal portion and a vertical portion (the vertical portion including the finger 64) and a pair of vertical plates 76, 77 which are welded to the bent plate 73. A horizontally extending brace 78 is welded to confronting sides of the plates 76, 77 and carries the abutment surface 71. The free ends of the vertical plates 76, 77 have aligned bores 81, 82 for receiving the pin 62. The ramp 67 includes a pair of angle members 86, 87 secured as by welding at their rear ends to a rectangular section bar member 88 of the upper link 42. The upward facing surfaces 91, 92 of the angle members 86, 87 are coplanar with the upward facing surface 93 of the bar 88. The surfaces 91, 92, 88 constitute a smooth camming surface for the end 94 of the finger 64 as will hereinafter be explained. The upward facing camming surface on the ramp 67 is broken by the recess 66 defined by confronting vertical surfaces 101, 102 on the vertical walls 103, 104 of the angle members 86, 87. A vertically disposed end plate 106 is welded to the front ends of the angle members 86, 87 for reinforcement purposes.

Figure 3:
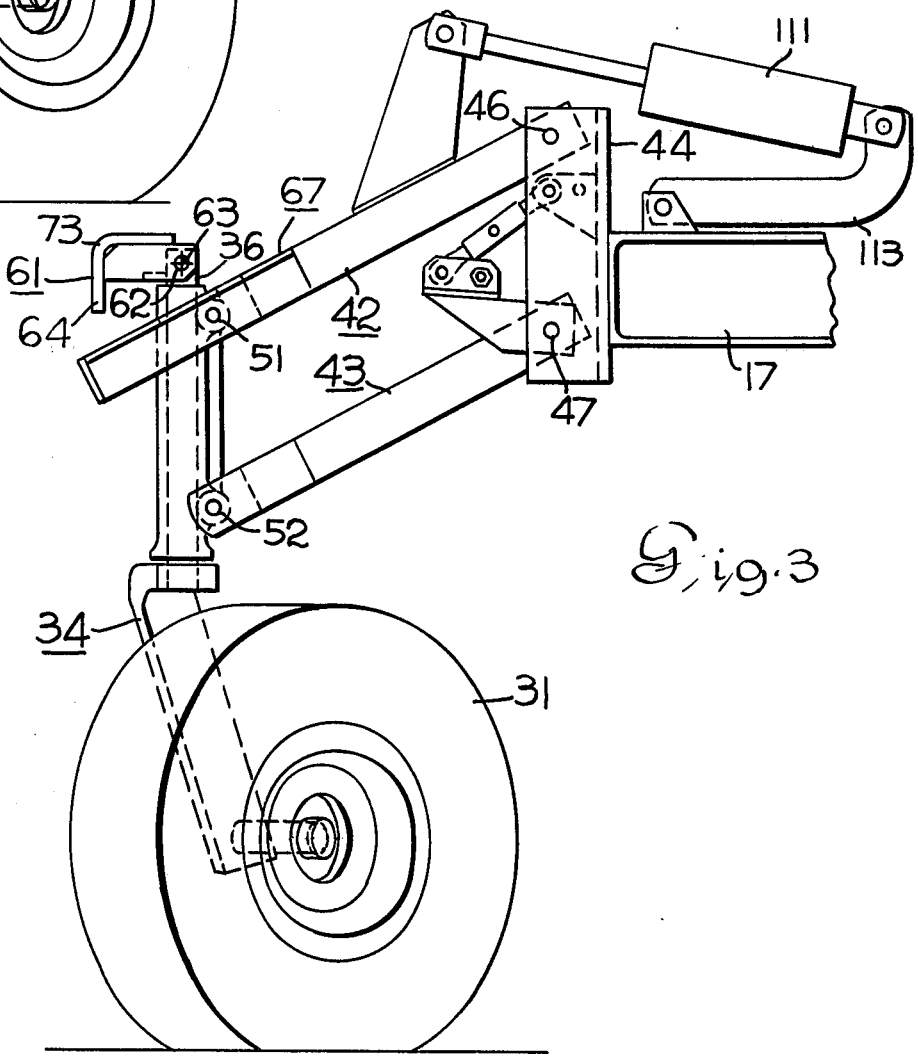
FIG. 3 is a view similar to FIG. 2 except showing the plow frame in a raised transport position.

When the plow frame 16 has been lowered to a plowing position as illustrated in FIG. 2 and the plow is being pulled in its normal straight ahead direction, the castered wheel 31 will trail as illustrated in FIGS. 1 and 2 and the finger 64 of the latch 61 will be disposed in the recess 66 thus locking the wheel support 34 against castering movement. When the hydraulic ram 111 is extended, the plow frame 11 will be raised to a transport position as shown in FIGS. 3 and 4 and the finger 64 of the latch will disengage from the recess 66 thus permitting the wheel 31 to caster during a turn at the end of the field or during transport of the plow. In the event it is necessary to back up the plow in its raised transport position, the wheel 31 is free to caster to a reverse travel position as shown in FIG. 4 in which case the finger 64 will cam on the upward facing, inclined camming surface of the ramp 67 as illustrated.

This invention provides a reliable automatic lock for preventing castering of a furrow wheel of a plow when the plow frame is lowered to a working or plowing position. The locking latch is biased by gravity thereby eliminating the need of springs or the like. During a reverse or backing movement of the plow, the latch cams on the camming surface of the flat ramp on the upper link part and does not interfere with castering movement of the wheel.

The embodiments of the invention in which an exclusive property or privilege is claimed are defined as follows:

1. In combination with an implement frame:
   a caster wheel support including an upstanding spindle part,
   a ground engaging wheel rotatably mounted on the lower end of said support,
   a parallel linkage interconnecting said spindle part to said implement frame for raising and lowering said implement frame between transport and working positions and permitting rotation of said support relative to said linkage about the axis of said spindle part, said linkage including upper and lower link parts, said upper link part being pivotally connected at one of its ends to said frame,
   means pivotally connecting the other end of said upper link part to said spindle part for relative rotation about a horizontal axis as said implement frame is raised and lowered,
   a latch pivotally connected to the upper end of said spindle part for swinging movement about a horizontal axis, and
   a ramp secured to the top of said upper link part in substantially surrounding relation to said spindle part, said ramp having a smooth, flat camming surface in confronting relation to said latch, said ramp including wall means defining a recess into which said latch extends to lock said support against rotation about the spindle part axis only when said frame is in its lowered position, said camming surface being horizontally disposed when said frame is in its lowered position.

2. The combination of claim 1 wherein said latch includes an abutment surface which engages said spindle part to limit pivoting movement of said latch in the direction toward said camming surface.

3. The combination of claim 2 wherein said camming surface extends in generally transverse relation to the axis of said spindle part.

4. The combination of claim 3 wherein said camming surface is upward facing and wherein said latch is biased by gravity toward said camming surface.

5. The combination of claim 4 wherein said ramp extends around said spindle part terminating in spaced confronting surfaces defining said recess.

6. In combination with an implement frame:
   a caster wheel support including an upstanding spindle,
   a ground engaging wheel rotatably mounted on the lower end of said support,
   a parallel linkage interconnecting said spindle to said implement frame for raising and lowering said implement frame between transport and working positions and permitting rotation of said support relative to said linkage about the axis of said spindle, said linkage including upper and lower links, said upper link being pivotally connected at one of its ends to said frame,
   means pivotally connecting the other end of said upper link to said spindle for relative rotation about a horizontal axis as said implement frame is raised and lowered,
   a latch pivotally connected to the upper end of said spindle for swinging movement about a horizontal axis, and
   a ramp secured to the top of said upper link in substantially surrounding relation to said spindle, said ramp having a smooth, flat camming surface in confronting relation to said latch, said ramp including wall means defining a recess into which said latch extends to lock said support against rotation about the spindle axis only when said frame is in its lowered position.

7. The combination of claim 6 wherein said camming surface is upward facing and wherein said latch is biased by gravity toward said camming surface.

8. The combination of claim 6 wherein said latch rides on said camming surface of said ramp when said frame is in its raised position and is moving in a direction opposite to the direction of movement of the plow during a plowing operation.

* * * * *